United States Patent
Discamps et al.

(10) Patent No.: US 8,284,097 B2
(45) Date of Patent: Oct. 9, 2012

(54) MULTI-MODE GROUND SURVEILLANCE AIRBORNE RADAR

(75) Inventors: Pierre Discamps, Merignac (FR); Eric Normant, Bordeaux (FR)

(73) Assignee: Thales, Neuilly sur Seine (FR)

( * ) Notice: Subject to any disclaimer, the term of this patent is extended or adjusted under 35 U.S.C. 154(b) by 386 days.

(21) Appl. No.: 12/754,744

(22) Filed: Apr. 6, 2010

(65) Prior Publication Data

US 2010/0283669 A1    Nov. 11, 2010

(30) Foreign Application Priority Data

Apr. 7, 2009   (FR) ...................................... 09 01699

(51) Int. Cl.
*G01S 13/00*    (2006.01)
(52) U.S. Cl. ......................................... 342/25 R; 342/52
(58) Field of Classification Search ............... 342/25 R, 342/52
See application file for complete search history.

(56) References Cited

U.S. PATENT DOCUMENTS

| | | |
|---|---|---|
| 5,812,082 A | 9/1998 | Moreira et al. |
| 7,511,665 B2 * | 3/2009 | Wicks et al. .................. 342/372 |
| 2007/0164894 A1 * | 7/2007 | Sherman et al. ............. 342/25 F |
| 2008/0129584 A1 | 6/2008 | Antonik et al. |
| 2009/0262006 A1 * | 10/2009 | McNeill et al. ................. 342/22 |

OTHER PUBLICATIONS

P. Hoogeboom, et al., "SOSTAR, A European System for Airborne Ground Surveillance", Internet Citation http://www.tno.nl/instit/fel/os/resources/SOSTAR_fullpaper.pdf, Sep. 24, 2001, 4 pages, XP002303903.
A. Currie, et al., Wide-Swath SAR, IEEE Proceedings of Radar and Signal Processing, Apr. 1, 1992, pp. 122-135, vol. 139, No. 2, XP002567604.

* cited by examiner

*Primary Examiner* — Timothy A Brainard
(74) *Attorney, Agent, or Firm* — Baker & Hostetler LLP

(57) ABSTRACT

Ground surveillance airborne radar device, characterized in that it reproduces a mapping of STRIPMAP type of an area of interest divided into bands (101), the images of these bands being captured successively, each according to a technique of scan SAR type, the operations for processing the image of a band (101) being produced successively to the capture of the image of this band (101) and in a manner concomitant with the realization of at least one additional radar mode, before the capture of the image of the following band (101).

8 Claims, 5 Drawing Sheets

MULTI-MODE GROUND SURVEILLANCE AIRBORNE RADAR

CROSS-REFERENCE TO RELATED APPLICATIONS

Figure 1:
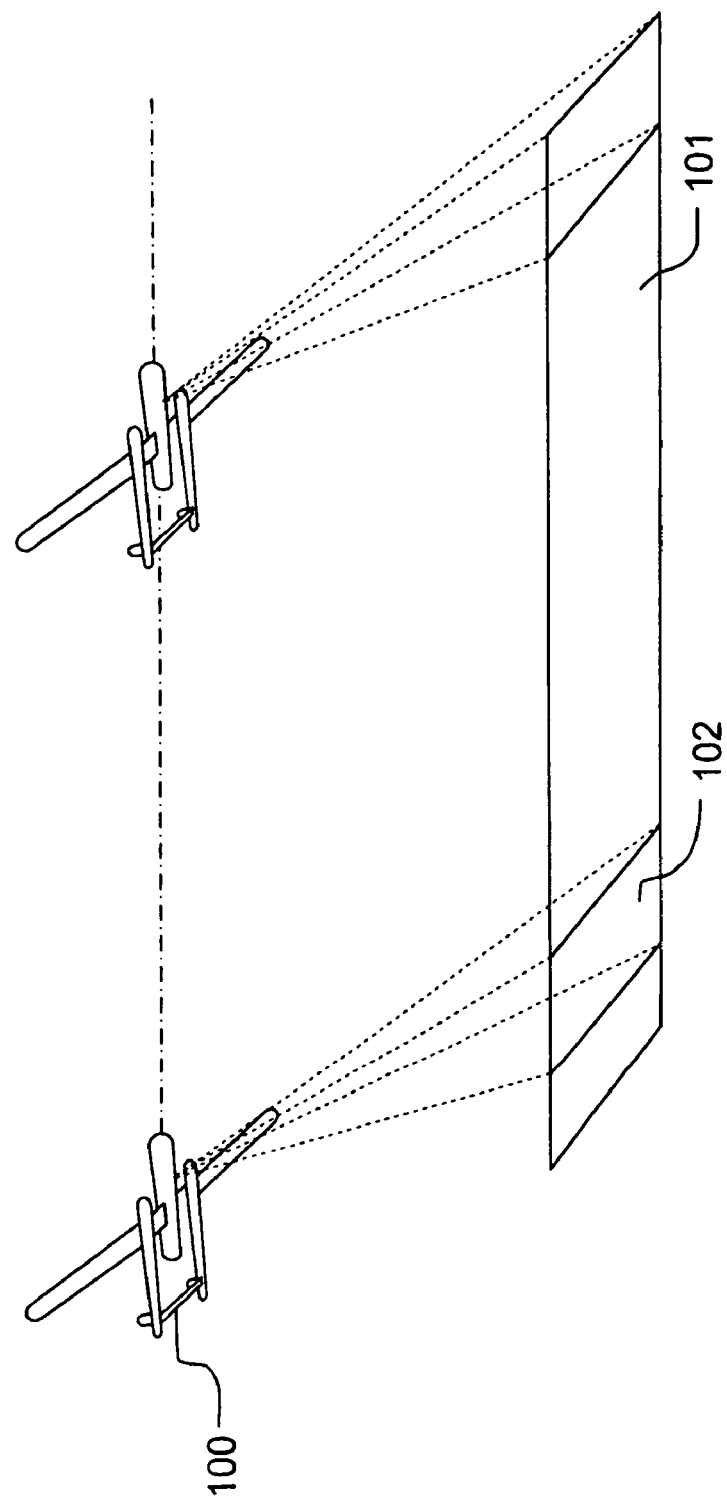

This application claims priority to foreign France patent application No. 09 01699, filed on Apr. 7, 2009, the disclosure of which is hereby incorporated by reference in its entirety.

BACKGROUND OF THE INVENTION

1. Technical field of the Invention

The present invention relates to a multi-mode ground surveillance airborne radar. It applies notably to the field of synthetic antenna radars aboard airborne platforms, or SAR radars according to the acronym standing for the expression Synthetic Aperture Radar, and more particularly to devices of this type intended to produce a large-swath image of the ground, according to the so-called STRIPMAP technique, from a safety distance from the terrain overflown.

2. Discussion on the background

A known application of synthetic antenna or SAR radars is the capture of images by successive strips, designated by the name STRIPMAP. According to this technique, an airborne platform, also dubbed a carrier, typically an aircraft, is equipped with a radar antenna, making it possible to construct an image in the form of a band, as the carrier advances, by juxtaposing a series of strips. The image of a whole area of interest can thereafter be constructed by juxtaposing all the bands. The aim of the radar antenna on the carrier is generally sideways-looking, and the capture of image strips is commonly carried out at an angle 90° to the axis of the carrier's velocity vector.

The image reconstructed by juxtaposing strips is thus a band whose width equals the width of a strip. This width is usually designated by the term swath. The length of the band is solely limited by the duration of selection of the radar mode as the carrier advances. Thus, the duration taken to obtain as output from the system a band of length X with a carrier the modulus of whose velocity is V, is equal to the time taken by the carrier to travel the distance X, i.e. X/V. For example 200 seconds are necessary for a carrier moving at a speed of 100 m/s, to produce an image over a band of a length of 20 km.

During these 200 seconds, the radar is mobilized full-time. Thus it can operate only in the STRIPMAP mode. For example it can provide information about the fixed echoes situated in the area covered by the band, but not about the moving echoes of targets moving around in this same area.

There exist radars known from the prior art, making it possible to provide multiple information about static targets and moving targets. These devices are based on combined SAR and GMTI modes, the acronym GMTI standing for the expression Ground Moving Target Indication, and being commonly used in the technical field of radars. However, radars currently capable of affording such functionalities are the most efficacious and the most expensive radars. The latter may notably employ two-plane electronic scan active antenna technologies coupled with extremely high calculation powers, so as to provide interleaved radar modes which in one and the same temporal sequence, extract the moving and fixed targets situated in a given area. These very sophisticated devices require several waveform generating systems and several receivers, and very significant calculation power. Furthermore, the carrier platform must be compatible with the constraints related to systems of this type, and must therefore notably be capable of stowing a significant volume onboard; the impact on fuel consumption of the carrier platform is also significant.

Stated otherwise, the existing devices allowing multi-mode radar operation, notably capable of ensuring the tracking of fixed and moving targets, are reserved for big, inflexible and relatively expensive systems.

SUMMARY OF THE INVENTION

A purpose of the present invention is to alleviate at least the aforesaid drawbacks, by proposing a multi-mode ground surveillance airborne radar device, notably capable of generating an imaging of STRIPMAP type of an area of interest, simultaneously, seen from the operator, with surveillance over the same area, of the terrestrial moving objects.

An advantage of the invention is related to the fact that it can be implemented using compact radar equipment, and relatively low calculation power.

Another advantage of the invention is related to the fact that the device according to the invention can allow the simultaneous execution of an imaging of STRIPMAP type in combination with other radar modes, and/or else the execution in a given time of an imaging of STRIPMAP type over a wider geographical area.

Accordingly, the subject of the invention is a multi-mode ground surveillance airborne radar, characterized in that it reproduces a mapping of STRIPMAP type of an area of interest divided into bands, the images of these bands being captured successively, each according to a technique of scan SAR type, the operations for processing the image of a band being produced subsequent to the capture of the image of this band and in a manner concomitant with the realization of at least one additional radar mode, before the capture of the image of the following band.

In one embodiment of the invention, the ground surveillance airborne radar can be characterized in that an additional mode is a mode for surveillance of terrestrial moving objects of GMTI type with wide area surveillance, or WAS GMTI according to the acronym standing for the expression Wide Area Surveillance GMTI, commonly used in the field of radars.

In one embodiment of the invention, the ground surveillance airborne radar can be characterized in that an additional mode is a very high resolution or ultra-high resolution imaging mode known by the name HR SPOT or UHR SPOT.

In one embodiment of the invention, the ground surveillance airborne radar can be characterized in that an additional mode is an imaging mode of STRIPMAP type.

In one embodiment of the invention, the ground surveillance airborne radar can be characterized in that an additional mode is a tracking mode of fast sector scan type, or "FSS" GMTI, FSS being the acronym standing for the expression "Fast Sector Scan".

In one embodiment of the invention, the ground surveillance airborne radar can be characterized in that an additional mode is a radar mode of Detection and/or tracking of aerial targets type.

In one embodiment of the invention, the ground surveillance airborne radar can be characterized in that an additional mode is a radar mode of Detection and/or tracking of marine targets type.

PRESENTATION OF THE FIGURES

Figure 2:
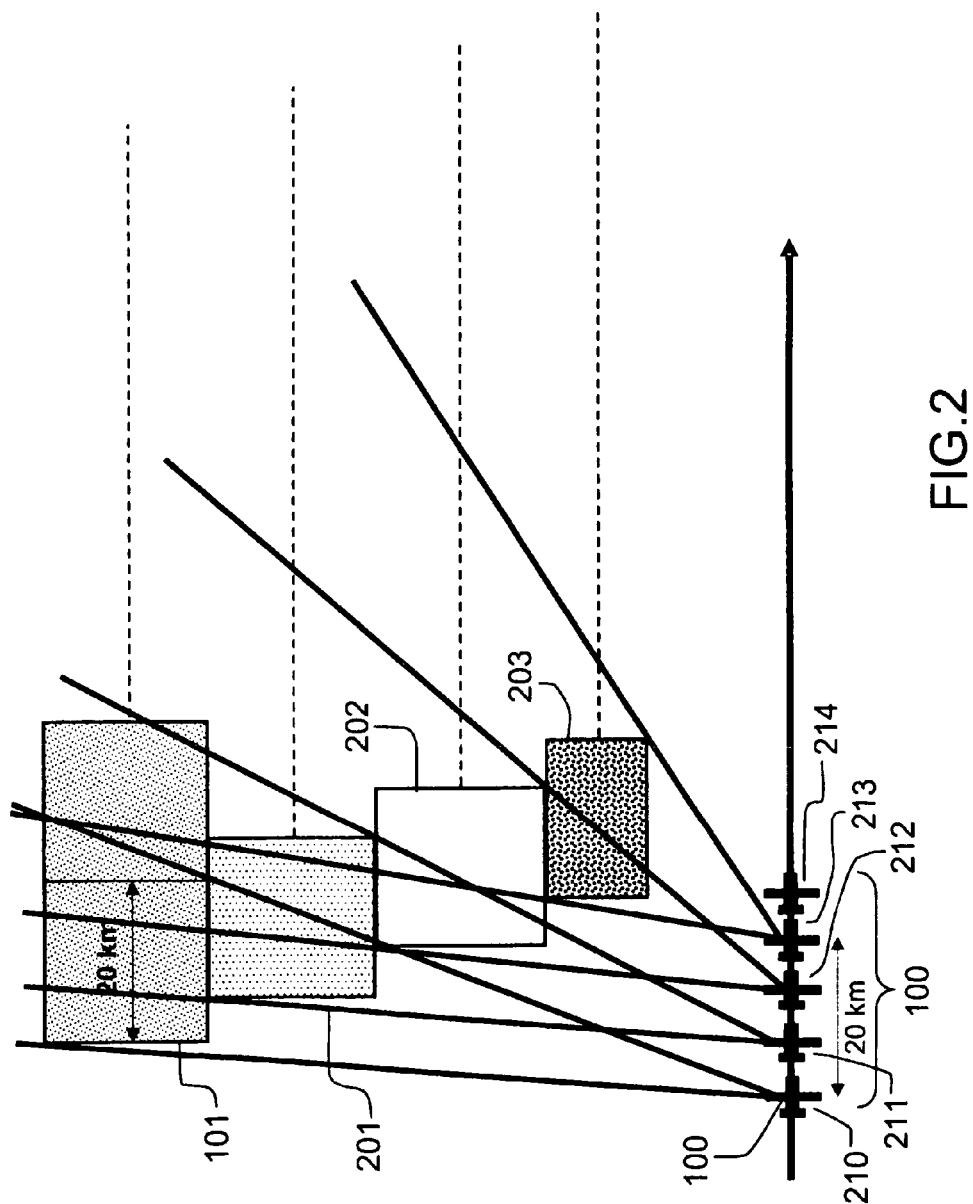
Figure 3:
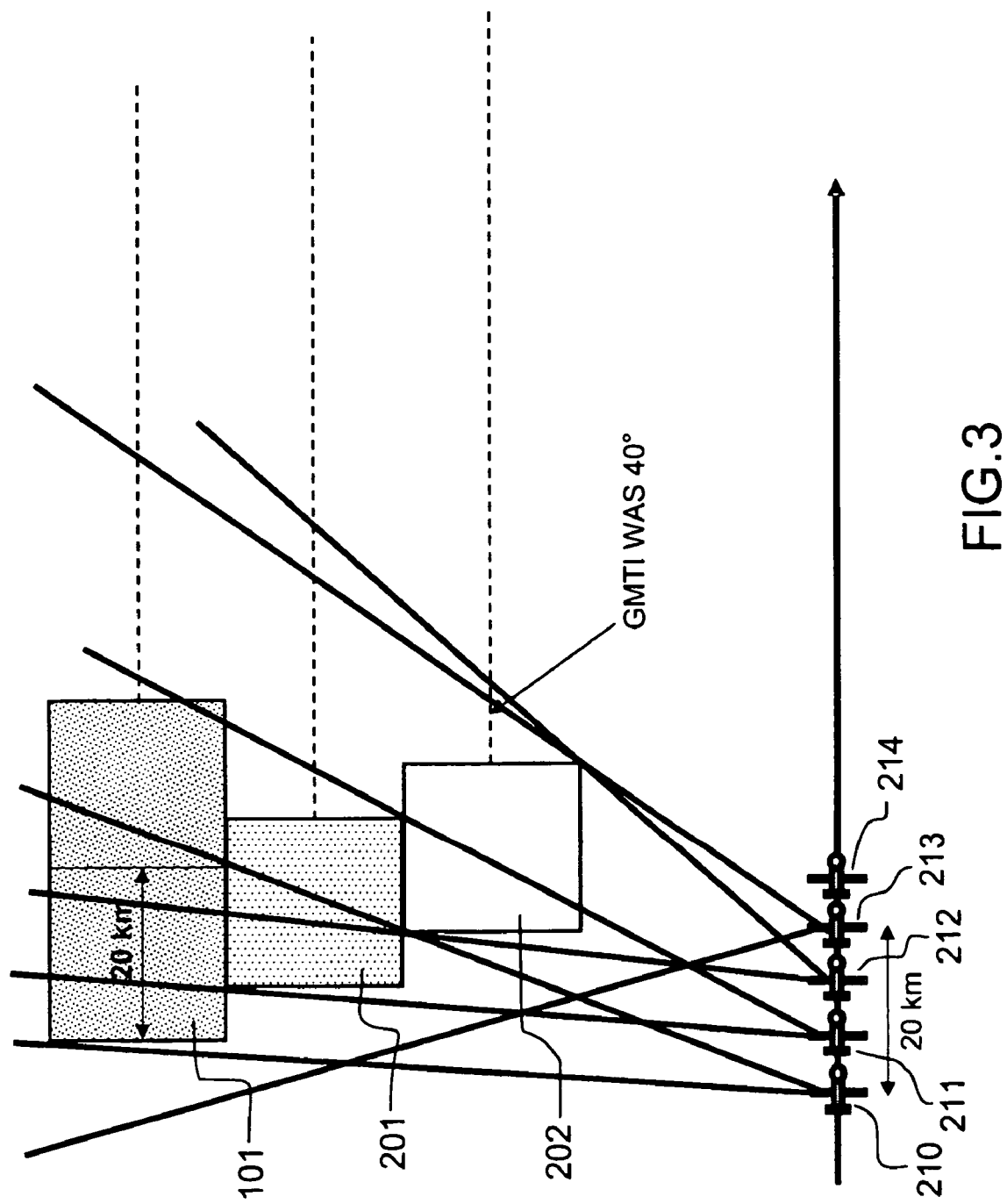
Figure 4:
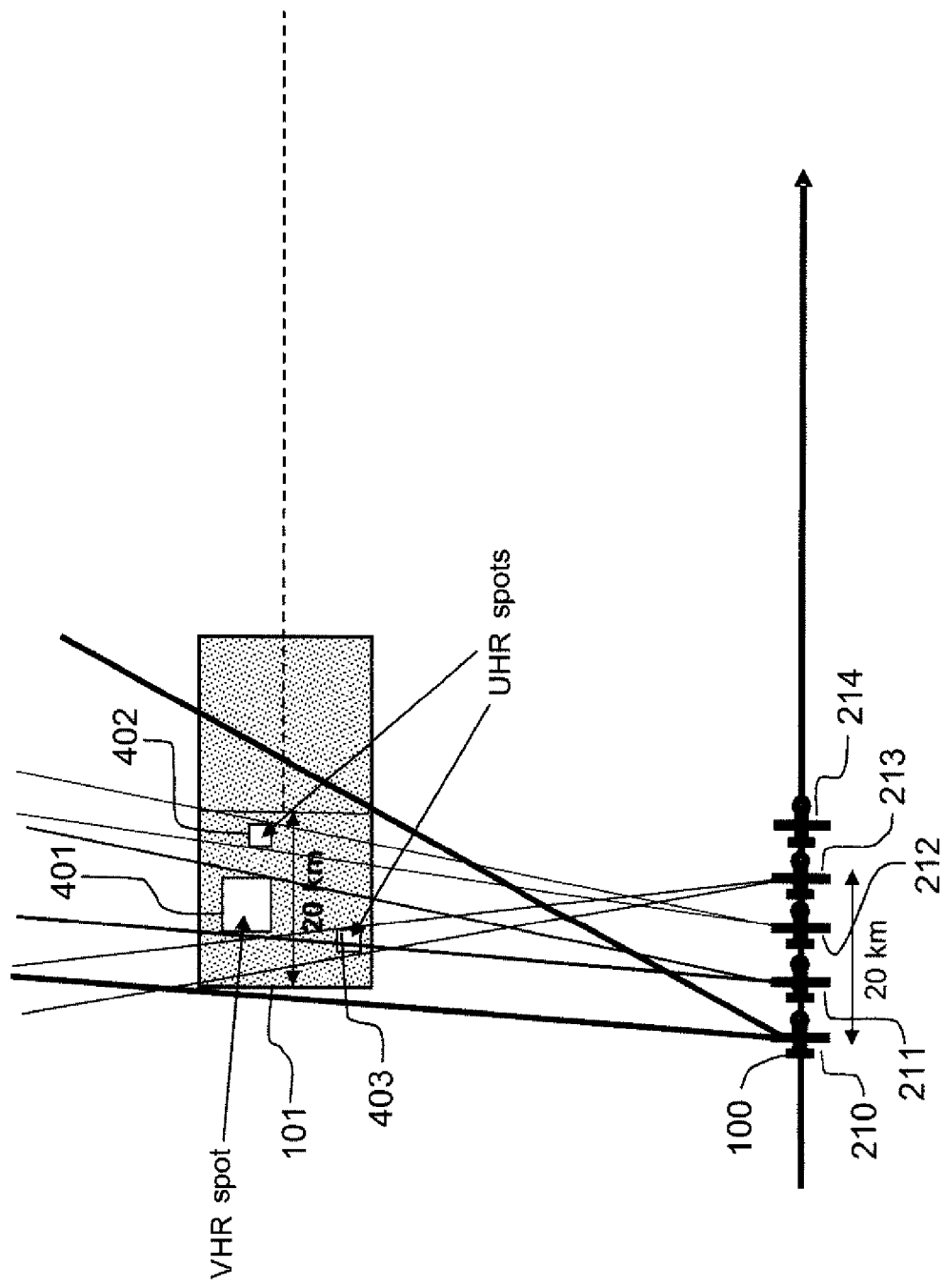
Figure 5:
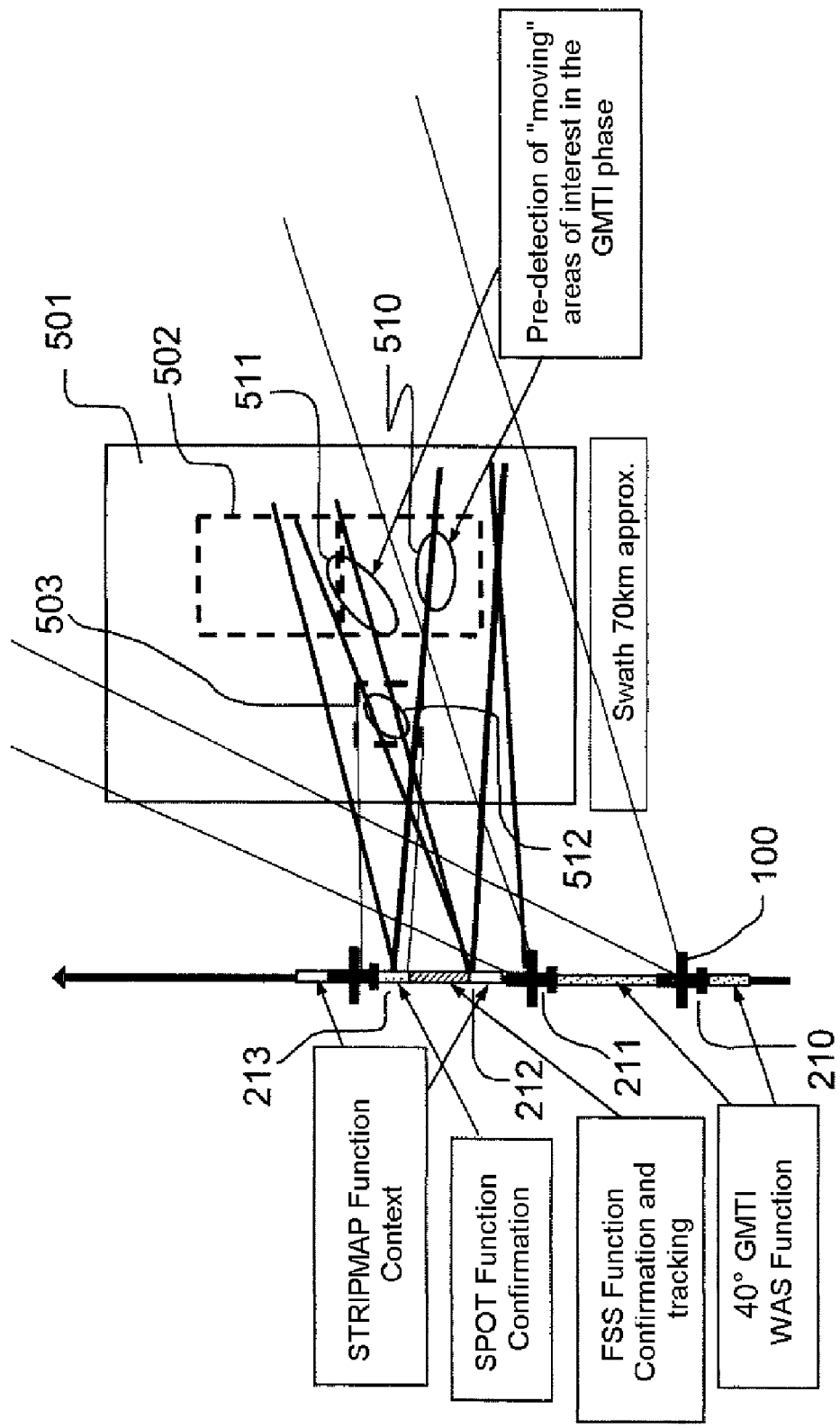

Other characteristics and advantages of the invention will become apparent on reading the description, given by way of example, and with regard to the appended drawings which represent:

FIG. 1, the schematic view of an exemplary airborne platform performing an imaging of STRIPMAP type on a band of an area of interest;

FIG. 2, the schematic view of an airborne platform performing an imaging of STRIPMAP type on an extended band of the area of interest, according to an exemplary embodiment of the present invention;

FIG. 3, the schematic view of an airborne platform performing an imaging of STRIPMAP type on an extended band of the area of interest, combined with a GMTI radar mode on the same area, according to an exemplary embodiment of the invention;

FIG. 4, the schematic view of an airborne platform performing an imaging of STRIPMAP type on a band of the area of interest, combined with the generation of images of high or very high definition within the band, according to an exemplary embodiment of the invention;

FIG. 5, the schematic view of an airborne platform performing an imaging of STRIPMAP type on a band of the area of interest, combined with a plurality of radar modes, according to an exemplary embodiment of the invention.

DESCRIPTION OF THE EMBODIMENTS

FIG. 1 presents the schematic view of an exemplary airborne platform, for example an aircraft, performing an imaging of STRIPMAP type on a band of a given area of interest.

An airborne platform 100 is equipped with a radar device allowing it to carry out a capture of images of STRIPMAP type, of a band 101 of an area of interest. The airborne platform 100 follows for example a rectilinear trajectory at a constant speed, and carries out image capture by strips 102 which are juxtaposed for display to the operator.

The juxtaposition of a plurality of strips 102 according to techniques which are in themselves known, allows the reconstruction of the image of the band 101.

The present invention proposes to use a technique adapted from the SAR image capture mode, dubbed VSAR according to the acronym standing for the expression Versatile SAR. The VSAR technique makes it possible to generate an image while scanning the area under surveillance by the antenna of the radar during the displacement of the airborne platform. Thus, the radar antenna no longer remains pointed in a fixed direction, but produces the scan of an area, in synchronization with the advance of the airborne platform. This scan can be carried out in a physical manner with a motorized antenna, or else in an electronic manner, with an electronic scanning antenna. The VSAR technique is in itself known from the prior art, and usually employed to produce high resolution mapping modes by scanning of the type commonly designated according to the expression Doppler Beam Sharpening or DBS. The resolutions offered by these modes of mapping are of the order of a decametre, typically of the 20 metres to 50 metres class. Historically, these modes have been embedded in airborne radars from the 1980s so as to provide wide-sector mapping, offering much better results than the ground mapping techniques known up to then. These modes were later supplanted, in the 1990s, by radar modes of higher resolution with pointed antenna, known by the term SPOT-SAR, or pointed SAR.

On the other hand, according to the present invention, the VSAR technique is used to produce a mapping of an area of interest with a result equivalent to that obtained via a traditional STRIPMAP technique while capturing the snapshot in less time than the time of advance of the aircraft; thus, some time can be allocated to the Radar system to operate in other modes, and to produce extra information. Examples of possible embodiments of the invention are given hereinafter with reference to the following figures.

Firstly, for the purpose of better understanding of the invention, a few theoretical considerations are developed hereinafter.

For a radar operating in scan SAR mode (VSAR), the optimal scan speed is calculated in such a way that the beam covers the area of which an image must be produced, necessarily larger than the size of the elementary beam, while spending sufficient time to satisfy the synthetic antenna aperture criterion allowing the sought-after resolution.

An approximate formula for calculating the resulting observation time is given below:

$$T_{obs} \approx \frac{\theta_{az} d \sin i + \Delta X}{V \sin \theta_{aim}} \times \frac{\theta_{sa}}{\theta_{az}}, \quad (1)$$

where:
i is the angle of incidence of the beam on the ground,
$\theta_{az}$ is the antenna aperture in Azimuth in radians,
d is the snapshot distance in metres,
$\Delta X$ is the size of the imaged area in metres,
$V \sin \theta_{aim}$ is the carrier speed projected onto the direction of aim ($\theta_{aim}$),
$\theta_{sa}$ is the synthetic antenna aperture.

The synthetic antenna aperture is related to the azimuthal resolution $\rho_{az}$ by the following formula:

$$\rho_{az} = \frac{\lambda}{2\theta_{sa} \sin i} \quad (2)$$

By combining relations (1) and (2), the observation time can be expressed according to the following relation:

$$T_{obs} \approx \frac{\lambda \Delta X}{2\theta_{az}\rho_{az}\sin i V \sin\theta_{aim}} + \frac{\lambda d}{2\rho_{az} V \sin\theta_{aim}} \quad (3)$$

The second term of relation (3) represents the observation time of the pointed SPOT mode added to the term corresponding to the fact that the beam does not entirely cover the swath to be viewed (term in $\Delta X$). It is noted that operation in pointed SPOT mode amounts to a zero value of $\Delta X$.

For an application of STRIPMAP type, $\theta_{aim}$ is close to 90° and at large distance, the angle of incidence i is also close to 90°. It is then possible to simplify relation (3) to obtain the following relation:

$$T_{obs} \approx \frac{\lambda \Delta X}{2\theta_{az}\rho_{az} V} + \frac{\lambda d}{2\rho_{az} V} \quad (4)$$

Now, $\Delta X/V$ represents the time taken by the carrier to advance parallel to the area of interest, i.e. $T_{advanc}$.

It is then possible to write:

$$T_{obs} \approx \frac{\lambda T_{advanc}}{2\rho_{az}} \left( \frac{1}{\theta_{az}} + \frac{d}{\Delta X} \right) \quad (5)$$

Relation (5) is independent of the speed of the airborne platform.

Thus, for a given radar, that is to say with a given azimuthal aperture, performing image capture at a large given distance d, the ratio $T_{obs}/T_{advance}$ is all the smaller, and therefore favourable to the realization of additional radar modes:

the larger the resolution $\rho_{az}$, the larger, with respect to the distance d, the swath produced $\Delta X$.

For example, for an azimuthal resolution $\rho_{az}$ equal to 3 metres, a snapshot distance equal to 120 kilometres, an image band length $\Delta X$ equal to 20 kilometres, an azimuthal aperture of the antenna equal to 30 milliradians, the ratio of observation time to advance time as calculated via relation (5) is equal to:

$$T_{obs}/T_{advance} = 19.6\%$$

Thus, if a technique of scan SAR type is employed for the purpose of producing a function of STRIPMAP type, the observation time alone—that is to say without consideration of the associated processing time, about which more details are given hereinafter—represents only around 20% of the time taken by the airborne platform 100 to cover a distance of 20 km, whereas by employing a standard STRIPMAP technique, the observation time is necessarily equal to the time of advance of the airborne platform.

As regards the processing time, whatever technique is employed, the radar device carries out the extraction of a map of the area after the acquisition of the data during the observation time.

The processing time is a combined function of several parameters.

To first order, the processing time is proportional to the swath $\Delta X$, to the depth of the image—or width of the image band—$\Delta Y$, to the snapshot distance d, and inversely proportional to the square of the azimuthal resolution $\rho_{az}$.

This time is of course not determined by a pure mathematical relation, but depends on the algorithm employed, the calculation power available and the signal processing architecture. To summarize, this time is dependent on the quality of design of the radar processing.

Built upon the state of the art of the latest-generation SAR radars, based on calculation maps such as commercially available, and under the calculation conditions of the numerical application of relation (5), it is possible to assert that the image calculation time for $\Delta X = \Delta Y$ is less than 15 seconds.

Thus, the total time to produce an image of the area of interest overflown during the observation time is approximately equal to $T_{obs}+15$ seconds.

Thus, for times of advance of the airborne platform of the order of 200 seconds, it is apparent that within the framework of the proposed invention, around 55 seconds are devoted to the construction of the image area, in comparison with the 200 seconds which are necessary to produce the same image area on the basis of the traditional STRIPMAP technology. The time freed through the use of the scan SAR technique to produce the image of a band of the area of interest, makes it possible to carry out other radar modes during the time remaining before the image capture of the following band.

FIG. 2 presents the schematic view of an airborne platform performing an imaging of STRIPMAP type on an extended band of the area of interest, according to an exemplary embodiment of the present invention.

According to this exemplary embodiment of the present invention, the airborne platform 100 follows a rectilinear trajectory at a constant speed, and occupies successive positions 210, 211, 212, 213, 214. At these various positions, the radar performs the capture of images of a plurality of bands 101, 201, 202, 203.

By using the time of advance of the airborne platform 100, and by employing a technique of scan SAR type, the radar is capable of producing images of several bands 101, 201, 202, 203, during a given advance time. During this same advance time, the same radar employing a technique of conventional STRIPMAP type, would perform only the capture of the image of the band 101.

For example, when the airborne platform 100 occupies the first position 210 and before reaching the second position 211, the radar performs the capture of the image of the first band 101. Thereafter, when the airborne platform 100 reaches the second position 211, the radar performs the capture of the image of the second band 201, in this example, juxtaposed with the first band 101 and closer to the airborne platform 100, before reaching the third position 212, where it performs the capture of the image of the third band 202, etc.

The juxtaposition of the various images makes it possible to reconstruct in the example of FIG. 2, where each band 101, 201, 202, 203 is a square 20 kilometres by 20 kilometres, an image of STRIPMAP type with extended swath of around 70 km situated in an area of 50 to 120 km from the airborne platform 100.

After the airborne platform 100 has traveled a distance of 20 kilometres from the first position 210, that is to say when it reaches the fourth position 214, the radar undertakes the capture of the image of a band juxtaposed with the band 101, and thus continues its wide area surveillance mission.

An advantage afforded by the invention is that the radar device can begin the processings aimed at producing the image of the first band 101, while performing the capture of the image of the second band 202, and so on and so forth. Stated otherwise, in a general way, the operations for processing the image of a band can be produced successively to the capture of the image of this band and in a manner concomitant with the realization of additional radar modes. The additional radar modes, in the example illustrated by FIG. 2, are other modes of capture of images of STRIPMAP type employing the scan SAR technique. The following figures illustrate other examples of additional radar modes.

FIG. 3 presents the schematic view of an airborne platform performing an imaging of STRIPMAP type over an extended band of the area of interest, combined with a GMTI radar mode on the same area, according to an exemplary embodiment of the invention.

In this exemplary embodiment of the invention, the radar is capable of providing an image of extended-swath STRIPMAP type, in a manner similar to the embodiment illustrated by FIG. 2, over a band of 60 km of terrain, and of superimposing therewith the detection of terrestrial vehicles by employing a mode of wide area surveillance GMTI, or WAS GMTI, type.

In the example illustrated by FIG. 3, when the airborne platform 100 occupies the first position 210 and before reaching the second position 211, the radar performs the capture of the image of the first band 101. Thereafter, when the airborne platform 100 reaches the second position 211, the radar performs the capture of the image of the second band 201, in this example, juxtaposed with the first band 101 and closer to the airborne platform 100, before reaching the third position 212, where it performs the capture of the image of the third band 202.

When the airborne platform 100 reaches the third position 213, the radar applies an operating mode of WAS GMTI type to perform a surveillance of terrestrial moving objects over the whole of the area covered by the three bands 101, 201 and 202.

After the airborne platform 100 has traveled a distance of 20 kilometres from the first position 210, that is to say when it reaches the fourth position 214, the radar undertakes the capture of the image of a band juxtaposed with the band 101, and thus continues its surveillance mission in a similar manner, or else by employing different additional radar modes.

FIG. 4 presents the schematic view of an airborne platform performing an imaging of STRIPMAP type on a band of the area of interest, combined with the generation of images of high or very high definition within the band, according to an exemplary embodiment of the invention.

In this exemplary embodiment of the invention, the radar is capable of providing an imaging of STRIPMAP type of a band of 20 km of terrain and of generating SPOT images of high or very high resolution on areas of interest situated within this band.

In the example illustrated by FIG. 4, when the airborne platform 100 occupies the first position 210 and before reaching the second position 211, the radar performs the capture of the image of the first band 101. Thereafter, when the airborne platform 100 reaches the second position 211, the radar can for example perform the capture of an image of very high resolution by employing a mode of VHR SPOT type, of a first area of interest 401 belonging to the first band 401. When the airborne platform 100 thereafter reaches the third position 212, the radar can for example perform the capture of an image of ultra-high resolution by employing a mode of UHR SPOT type, of a second area of interest 402. When the airborne platform 100 reaches the fourth position 213, the radar can for example again perform an image capture of UHR SPOT type for a third area of interest 403.

After the airborne platform 100 has traveled a distance of 20 kilometres from the first position 210, that is to say when it reaches the fourth position 214, the radar undertakes the capture of the image of a band juxtaposed with the band 101, and thus continues its surveillance mission in a similar manner, or else by employing different additional radar modes.

FIG. 5 presents the schematic view of an airborne platform performing an imaging of STRIPMAP type on a band of the area of interest, combined with a plurality of radar modes, according to an exemplary embodiment of the invention.

In the exemplary embodiment of the invention illustrated by FIG. 5, it is possible for the radar to detect terrestrial moving objects by employing a technique of WAS GMTI type, to produce the image of a band 20 kilometres in depth by employing a mode of STRIPMAP type, to track the moving targets of interest by virtue of a mode of fast sector scan type, or "FSS" GMTI, and to concentrate on a particular area of interest so as to perform thereon an image capture of ultra-high definition by employing a technique of UHR SPOT type.

When the airborne platform 100 occupies the first position 210, the radar can perform a predetection of terrestrial moving objects by employing a technique of WAS GMTI type, on a first area 501 of relatively wide extent, for example with a swath of 70 kilometres. When the airborne platform 100 reaches the second position 211, the radar can then perform an image capture of STRIPMAP type, by employing a technique of scan SAR type, of an area 502 within which have been detected suspicious activities of terrestrial moving objects 510 and 511. This image capture allows the operator to superimpose the terrain context, comprising roads, infrastructures, etc., with the moving targets detected. When the airborne platform 100 reaches the third position 212, and until it reaches the fourth position 213, the radar can for example employ a function of FSS GMTI type, so as to track and/or identify the terrestrial moving objects of interest. During this time span, by virtue of its mode of tracking of the moving targets (FSS GMTI), the radar can track/detect a target 503 which has halted its motion and therefore exhibits a particular operational interest. When the airborne platform 100 reaches the fourth position 213, the radar can then undertake the realization of an image of very high resolution or of ultra-high resolution of the target of interest 503 which has become a fixed target, for confirmation purposes, by employing a technique of VHR or UHR SPOT type.

When the airborne platform reaches a position from where it can resume this operating scheme, the steps previously cited can recommence, or else other radar modes can be undertaken.

It should be noted that the embodiments of the present invention that were presented above with reference to the figures, are simply examples of possible schemes of combinations of radar modes. Of course, all the types of schemes comprising all the types of radar modes that are known can be envisaged, for example modes of maritime surveillance, or surveillance of the surrounding airspace, or else modes of meteorological surveillance, etc. The only limits are related to the hardware capabilities of the radar device onboard the airborne platform 100, to the imagination of the operator and to the temporal feasibility of the scheme.

The invention claimed is:

1. Ground surveillance airborne radar device, producing a mapping of STRIPMAP type of an area of interest divided into bands, the images of these bands being captured successively, each according to a technique of scan SAR type, the operations for processing the image of a band being produced subsequent to the capture of the image of this band and in a manner concomitant with the realization of at least one additional radar mode, before the capture of the image of the following band.

2. Airborne radar device according to claim 1, in which at least one additional mode is a mode for surveillance of terrestrial moving objects of WAS GMTI type.

3. Airborne radar device according to claim 1, in which at least one additional mode is a very high resolution or ultra-high resolution imaging mode of HR SPOT or UHR SPOT type.

4. Airborne radar device according to claim 1, in which at least one additional mode is an imaging mode of STRIPMAP type.

5. Airborne radar device according to claim 1, in which at least one additional mode is a tracking mode of type FSS.

6. Airborne radar device according to claim 1, in which at least one additional mode is a radar mode of Detection and/or tracking of aerial targets type.

7. Airborne radar device according to claim 1, in which at least one additional mode is a radar mode of Detection and tracking of marine targets type.

8. Airborne radar device according to claim 1, in which at least one additional mode is a radar mode of tracking of marine targets type.

* * * * *